United States Patent
Dolby et al.

(10) Patent No.: US 11,507,352 B1
(45) Date of Patent: Nov. 22, 2022

(54) REDUCING SEMANTIC ERRORS IN CODE GENERATED BY MACHINE LEARNING MODELS

(71) Applicant: International Business Machines Corporation, Armonk, NY (US)

(72) Inventors: Julian Timothy Dolby, Bronx, NY (US); Martin Hirzel, Ossining, NY (US); Kiran A Kate, Chappaqua, NY (US); Louis Mandel, New York, NY (US); Avraham Ever Shinnar, Westchester, NY (US); Kavitha Srinivas, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/347,624

(22) Filed: Jun. 15, 2021

(51) Int. Cl.
| | |
|---|---|
| *G06F 9/44* | (2018.01) |
| *G06F 8/41* | (2018.01) |
| *G06N 3/08* | (2006.01) |
| *G06F 11/36* | (2006.01) |
| *G06F 8/35* | (2018.01) |
| *G06N 3/04* | (2006.01) |

(52) U.S. Cl.
CPC ............... *G06F 8/436* (2013.01); *G06F 8/35* (2013.01); *G06F 11/3608* (2013.01); *G06N 3/08* (2013.01); *G06N 3/0445* (2013.01)

(58) Field of Classification Search
None
See application file for complete search history.

(56) References Cited

U.S. PATENT DOCUMENTS

| | | | |
|---|---|---|---|
| 10,331,415 B2 | 6/2019 | Hatsutori et al. | |
| 10,346,140 B2 | 7/2019 | Johnson et al. | |
| 2007/0074180 A1* | 3/2007 | Hinchey | G06F 8/10 717/136 |
| 2020/0026577 A1* | 1/2020 | Dias | G06F 8/74 |
| 2021/0056211 A1* | 2/2021 | Olson | G06F 16/9024 |
| 2021/0182031 A1* | 6/2021 | Ye | G06F 8/74 |

FOREIGN PATENT DOCUMENTS

| | | |
|---|---|---|
| CN | 108763931 A | 11/2018 |
| CN | 109697162 A | 4/2019 |
| CN | 112269568 A | 1/2021 |

OTHER PUBLICATIONS

Karaivanov et al., "Phrase-Based Statistical Translation of Programming Languages", Onward! 2014: Proceedings of the 2014 ACM International Symposium on New Ideas, New Paradigms, and Reflections on Programming & Software, Oct. 2014, 12 pages.

(Continued)

*Primary Examiner* — Qamrun Nahar
(74) *Attorney, Agent, or Firm* — Donald J. O'Brien

(57) ABSTRACT

Embodiments are disclosed for a method. The method includes identifying a prefix updated by a searcher of a machine learning model. The machine learning model is configured to generate source code in a programming language. The method also includes determining whether the prefix violates a semantic correctness property of the programming language. Additionally, the method includes instructing the searcher, in response to the determination, to prune the prefix from a set of prefixes under consideration by the searcher.

20 Claims, 6 Drawing Sheets

(56) References Cited

OTHER PUBLICATIONS

Mukherjee et al., "Neural Attribute Grammars for Semantics-Guided Program Generation", Feb. 20, 2021, 20 pages.
Agarwal et al., "Quality Estimation & Interpretability for Code Translation", Apr. 26, 2021, 7 pages.
Mell et al., "The NIST Definition of Cloud Computing", Recommendations of the National Institute of Standards and Technology, Sep. 2011, 7 pages.

* cited by examiner

US 11,507,352 B1

REDUCING SEMANTIC ERRORS IN CODE GENERATED BY MACHINE LEARNING MODELS

BACKGROUND

The present disclosure relates to reducing code containing errors, and more specifically, to reducing semantic errors in code generated by machine learning models.

Computer software can be written as code, more specifically, program source code in a programming language such as, Java, Python, C, and the like. Machine learning models, such as deep learning models, can be trained to automatically generate such code. For example, translation models can generate code in a target language based on code in a source language. Other examples for code-generating models include, but are not limited to, generating code from a natural language, such as English or Spanish. Additionally, machine learning models can generate code that auto-completes an incomplete fragment of input code, or generate code based on input/output examples, and the like. Unfortunately, such code-generating models often generate invalid code. For example, such models have been found to generate code with errors, including, undefined variables, syntax errors, redefined functions; and, with various other issues, including warnings or coding conventions, such as unused variables, redefined built-ins, and the like.

SUMMARY

Embodiments are disclosed for a system. The system includes computer processing circuits and computer-readable storage media storing program instructions that are configured to cause computer processing circuits to perform a method. The method includes identifying a prefix updated by a searcher of a machine learning model. The machine learning model is configured to generate source code in a programming language. The method also includes determining whether the prefix violates a semantic correctness property of the programming language. Additionally, the method includes instructing the searcher, in response to the determination, to prune the prefix from a set of prefixes under consideration by the searcher. Advantageously, such embodiments are useful for improving the reliability of code-generating machine learning models by reducing the semantic errors in generated code.

Optionally, in some embodiments, the system causes the computer processing circuits to perform a method that further includes completing the prefix before determining whether the prefix violates the semantic correctness property. Additionally, the completed prefix includes a completed unit of source code in the programming language. Advantageously, such embodiments are useful for improving the reliability of code-generating machine learning models by reducing the semantic errors in generated code.

Embodiments are disclosed for a method. The method includes identifying a prefix updated by a searcher of a machine learning model. The machine learning model is configured to generate source code in a programming language. The method also includes determining whether the prefix violates a semantic correctness property of the programming language. Additionally, the method includes instructing the searcher, in response to the determination, to prune the prefix from a set of prefixes under consideration by the searcher. Advantageously, such embodiments are useful for improving the reliability of code-generating machine learning models by reducing the semantic errors in generated code.

Optionally, in some embodiments, the method further includes instructing the searcher to prune the prefix comprises assigning a weight to the prefix based on the semantic correctness property. Advantageously, such embodiments are useful for improving the reliability of code-generating machine learning models by reducing the semantic errors in generated code.

An additional embodiment is disclosed for a computer program product that includes computer readable storage media, and program instructions stored on the computer readable storage media. The program instructions are configured to cause one or more processors to perform a method that includes identifying a prefix updated by a searcher of a machine learning model. The machine learning model is configured to generate source code in a programming language. Further the method includes determining whether the prefix violates a semantic correctness property of the programming language. Additionally, the method includes instructing the searcher, in response to the determination, to prune the prefix from a set of prefixes under consideration by the searcher. The method also includes completing the prefix before determining whether the prefix violates the semantic correctness property. The completed prefix includes a completed unit of source code in the programming language.

Optionally, in some embodiments, the computer program product includes program instructions configured to cause the processors to perform a method that further includes providing a ground truth for an output code generated by the machine learning model. Additionally, the method includes normalizing the ground truth. Further, the method includes determining a loss by using a loss function for the ground truth and the output code. The method also includes training the machine learning model based on the loss.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
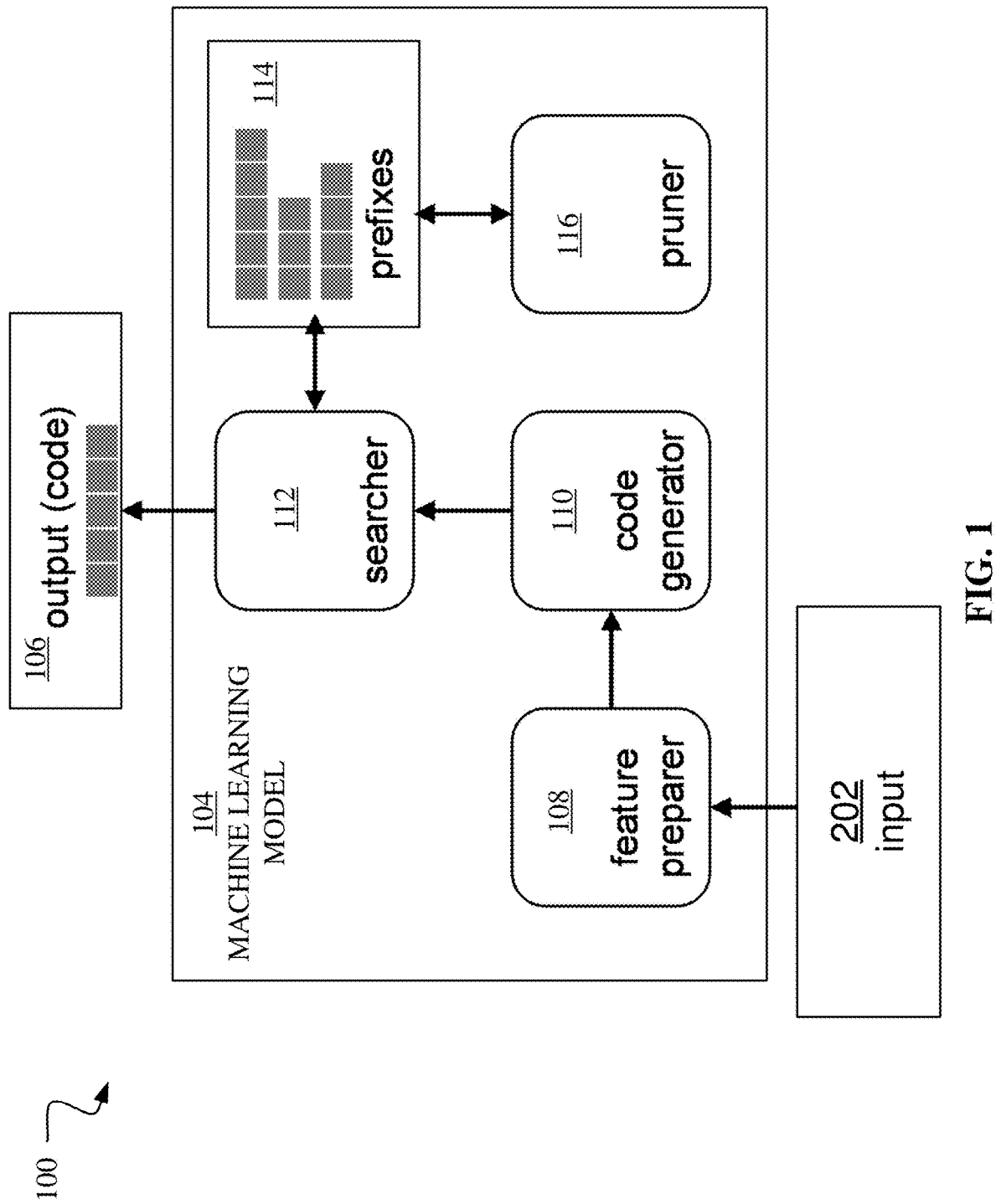
FIG. 1 is a block diagram of an example system for reducing semantic errors in code generated by machine learning models, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, machine learning models can be trained to automatically generate code. However, code-generating models that frequently generate invalid code limit their usefulness. Generating invalid code ends up wasting the time of human software developers who are trying to use the model to increase their productivity, i.e., automatically generate code. However, instead of increasing the productivity of the software developer, invalid code generated in this way can cause the software developer to read through generated code to find the mistakes caused by the machine learning model. Further, generating invalid code can erode trust and respect in the code-generating model, and any tools built based on such models.

Accordingly, some embodiments of the present disclosure can provide a pruning component that identifies invalid code prefixes, e.g., code snippets, generated by a machine learning model. By identifying invalid code prefixes, embodiments of the present disclosure can prevent machine learning models from generating longer segments of code, e.g., a completed Java function, that incorporate the invalid code prefixes.

In this way, some embodiments of the present disclosure can improve the operation of code-generating machine learning models by reducing the number of invalid code prefixes that are incorporated into their generated code. Additionally, some embodiments of the present disclosure can thus improve the operation of tools based on such machine learning models.

FIG. 1 is a block diagram of an example system 100 for reducing semantic errors in code generated by machine learning models, in accordance with some embodiments of the present disclosure. The system 100 includes an input 102, machine learning model 104, and output code 106.

The input 102 can be any of numerous potential inputs to a code-generating machine learning model. For example, the input 102 can be a vector of features or a sequence of tokens, such as, tokens of natural language, code, or other modalities. As such, the input 102 can include code, words, images, sounds, or any similar inputs for code-generating machine learning models.

The machine learning model 104 can be a code-generating machine learning model. For example, deep learning models can be trained to automatically generate code. For example, the machine learning model 104 can be a translation model that generates code in a target language based on code in a source language. Other examples for code-generating models include, but are not limited to, machine learning models that generate code from a natural language, such as English or Spanish. Additional examples of the machine learning model 104 can include machine learning models that generate code that automatically completes an incomplete fragment of input code, or generates code based on input/output examples, and the like.

Accordingly, the machine learning model 104 can generate the output code 106 based on the input 102 and the type of machine learning model 104. For example, a machine learning model 104 that translates code can translate an input 102 of Java code into a determined equivalent output code 106 in C++.

The machine learning model 104 can include a feature preparer 108, code generator 110, searcher 112, prefixes 114, and pruner 116. The feature preparer 108 can ingest the input 102. Ingesting the input 102 can involve translating the input 102 into a latent space feature representation, e.g., an intermediate vector-space representation, of the machine learning model's training data (not shown). In other words, the feature preparer 108 can format the input 102 into a vector space different from the space of features of the training data, even if the training data also uses a vector format.

The code generator 110 can generate tokens based on the latent space feature representation of the input 102. The code generator 110 can use one of various architectures, such as, a recurrent neural network. A recurrent neural network can be unrolled over time to generate tokens left-to-right. Alternatively, the code generator 110 can use transformer architectures or phrase-based approaches to generate code. The code generator 110 can generate one token at a time for input to the searcher 112. Further, in some embodiments of the present disclosure, the code generator 110 can use an encoder/decoder to generate tokens.

The searcher 112 can create prefixes 114 from the generated tokens. The prefixes 114 can be snippets of code composed of the generated tokens. Specifically, the searcher 112 can explore different code sequences in the prefixes 114 based on the tokens that the code generator 110 generates. More specifically, the searcher 112 can perform a beam search to explore different code sequences, maintaining a fixed list, or "beam", of partially-generated code sequences, i.e., prefixes 114. Further, the searcher 112 can prioritize the prefixes 114 based on the likelihood of leading to a good full output sequence, i.e., valid completed code. Additionally, the searcher 112 can limit the beam size to avoid exploring an exponential number of possible prefixes.

The pruner 116 listens to updates that the searcher makes to the beam. Thus, when the searcher 112 updates a prefix 114, the pruner 116 can analyze the updated prefix to determine if the updated prefix violates a semantic correctness property. A prefix 114 that violates a semantic correctness property can include code that is syntactically correct, but that violates a standard that makes the code inexecutable. One example of a semantic correctness violation is code that uses an undefined variable. Thus, while the syntax of the code using the undefined variable may be correct, it may not be possible to execute such code because there is no memory reserved for the undefined variable. Accordingly, if the pruner 116 determines that the updated prefix violates a semantic correctness property, e.g., is incorrect, the pruner 116 can instruct the searcher 112 to prune the updated prefix from the beam. In this way, the pruner 116 can free up space in the beam for other prefixes that have a better chance to ultimately lead to valid output code 106.

In this example, the machine learning model 104 can represent a long short-term memory network (LSTM). Long short-term memory networks are a type of recurrent neural network that uses learning order dependence for sequence prediction problems. While this example represents an LSTM, some embodiments of the present disclosure can use other types of machine learning models.

According to some embodiments of the present disclosure, the machine learning model 104 can use any statistical techniques that predicts a next code token given a prefix token sequence, also known as auto-regressive generative models. Additionally, the machine learning model 104 can use a searcher 112 with beam-search for decoding the vector representation of the input 102. Some examples of such machine learning models 104 include n-gram based generators, recurrent neural network based generators, transformer architecture based generators, and the like. As mentioned earlier, when the searcher 112 generates the beam of prefixes 114 to maintain, the pruner 116 can analyze the beam, identify invalid prefixes, and direct the searcher to prune these invalid prefixes. In this way, the pruner 116 can enable the machine learning model 104 to discard prefixes 114 having semantic errors.

The pruner 116 can enforce a variety of semantic correctness properties, such as, for example, a prefix 114 that includes code that defines a variable that cannot be used. For example, a beam can include the following EXAMPLE PREFIX 1:

interface bad {
   default void calc(int a) {
     int c=a+1;
EXAMPLE PREFIX 1

While there are valid ways to generate a valid output code 106 with EXAMPLE PREFIX 1, the code generator 110 may generate the token, }, resulting in EXAMPLE PREFIX 2:

interface bad {
   default void calc(int a) {
     int c=a+1;
}
EXAMPLE PREFIX 2

The EXAMPLE PREFIX 2 is still syntactically correct Java code. However, while the variable c is defined, adding the "}" token closes the scope of the calc( ) function. Thus, the variable c is not available for use. Accordingly, to avoid generating code with the unusable c variable, the pruner 116 can instruct the searcher 112 to discard EXAMPLE PREFIX 2.

By pruning prefixes 114 with semantic errors, the pruner 116 can enable the machine learning model 104 to generate output code 106 with higher-quality results than possible with current systems, thus increasing the productivity of developers using the machine learning model 104, and the trust of the developers in the machine learning model 104.

As described previously, the pruner 116 can check the semantic correctness of a prefix 114, which can be an incomplete program in the programming language targeted by the machine learning model 104. However, existing tools for checking code validity may work on complete programs (or complete code units, such as functions). One approach to use such existing tools would be to automatically add a speculative completion to the prefix 114. While this approach may yield the desired functionality, the approach may be too computationally expensive in practice. The reason this approach may be too computationally expensive is because the check of a prefix 114 of length (n+1) may be unable to reuse the computation performed for the previously-performed check of the prefix 114 of length n. Accordingly, in some embodiments of the present disclosure, the pruner 116 can perform the check more efficiently by performing incremental pruning.

According to some embodiments of the present disclosure, the pruner 116 can perform incremental pruning by using incremental attribute grammars. Attribute grammars are formal syntactic grammars augmented with semantic attributes, and associate the defined attributes with values. The values can be determined based on evaluation rules and the placement of the attributes within a construct, such as an abstract syntax tree. Thus, the searcher 112 can generate an abstract syntax tree for each prefix 114. Further, the searcher 112 can propose extending a prefix 114 with a newly generated token. Additionally, an incremental parser (not shown) can extend the abstract syntax tree of the old prefix with the newly added token. Further, an incremental semantic analyzer (not shown) can propagate attributes from the previous state of the abstract syntax tree by comparing the previous prefix to the newly-modified portions of the abstract syntax tree. Additionally, an incremental checker (not shown) can validate whether the current set of attributes demonstrate a violation of a semantic correctness property. If so, the pruner 116 can instruct the searcher 112 to prune the proposed update to the prefix 114.

Further, in some embodiments of the present disclosure, instead of pruning, the pruner 116 may rank prefixes with semantic errors. For example, the pruner 116 can assign a weight (e.g. a number between 0 and 1) to the prefix 114. Weighing prefixes 114 in this way can enable a soft pruning, thereby penalizing code that may not be wrong, but still semantically problematic. For example, the pruner 116 may determine that a prefix 114 contains problematic variable names, includes unused variables, unused arguments, or undefined behavior, e.g., in C/C++. Thus, while not incorrect, it may still be useful for the pruner 116 to penalize such prefixes 114 in some way. Accordingly, the searcher 112, when prioritizing prefixes 114 in a beam, can factor in the assigned weight. The searcher 112 can factor in the assigned weight in various ways, including by multiplying it with an internal score determined by the machine learning model 104. This internal score can be the estimated probability of the sequence.

Figure 2:
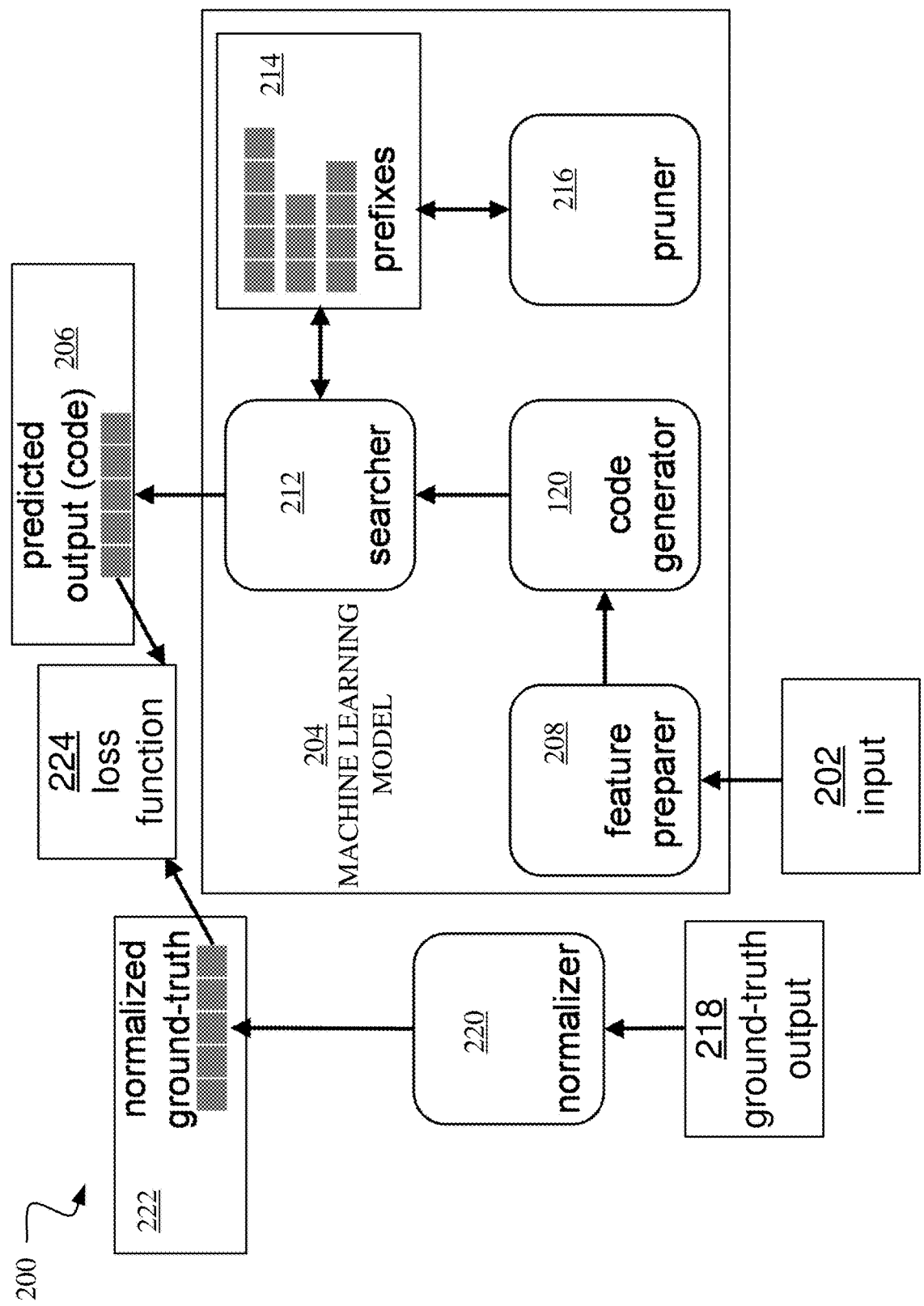
FIG. 2 is a process flow diagram of an example method for reducing semantic errors in code generated by machine learning models, in accordance with some embodiments of the present disclosure.

FIG. 2 is an example system 200 for reducing semantic errors in code generated by machine learning models, in accordance with some embodiments of the present disclosure.

The system 200 is similar to the system 100 described with respect to FIG. 1. For example, the system 200 includes input 202, machine learning model 204, and predicted output code 206, which are similar to the input 102, machine learning model 104, and output code 106. Further, the machine learning model 204 includes a feature preparer 208, code generator 210, searcher 212, prefixes 214, and pruner 216, which are similar to the feature preparer 108, code generator 110, searcher 112, prefixes 114, and pruner 116. However, in contrast to system 100, the system 200 includes ground truth output 218, normalizer 220, normalized ground truth 222, and loss function 224.

As stated previously, the pruner 216 can semantically validate the prefix 214, which can be a snippet of code in a longer program. However, with some programming languages, it is not possible to determine the semantic validity of relatively short snippets of code. For example, with respect to variable declaration, some programming languages allow references to a variable before declaring the variable in the code of the program. In such cases, it may not be possible to determine if a prefix 214 has an undeclared variable until the prefix 214 is further extended. Additionally, without the longer prefix, the exploration space for determining semantic validity may be too large for the pruner 216 to determine semantic validity in a computationally efficient manner.

Accordingly, to mitigate this issue, the system 200 may normalize the ground truth output 218 such that the pruner 216 can check certain properties on the shorter prefixes. Thus, the ground truth output 218 can represent an expected output, e.g., predicted output code 206. Accordingly, the normalizer 220 can generate a normalized ground truth 222. The normalized ground truth 222 can be code that is functionally equivalent to the original ground-truth output 218, but has been refactored to a form where semantic properties are easier to check on a prefix without knowing the entire code sequence. Further, the loss function 224 can compare the normalized ground truth 222 with the predicted output code 206 to determine a loss. In this example, a normalized ground truth 222 can include variable declarations positioned in the code before being referenced. Determining a loss in this way can make it possible to train the machine learning model 204 to generate prefixes 214 in a form that enables early pruning. Thus, the normalizer 220 can operate on the ground truth output 218, turning it into the normalized ground truth 222. Then, the loss function 224 takes as input both this normalized ground truth 222 and the predicted output code 206, to compute a loss for the predicted output code 206 that the machine learning model 204 can use to learn how to generate better code, i.e., prefixes 214 that are configured for earlier pruning.

Figure 3:
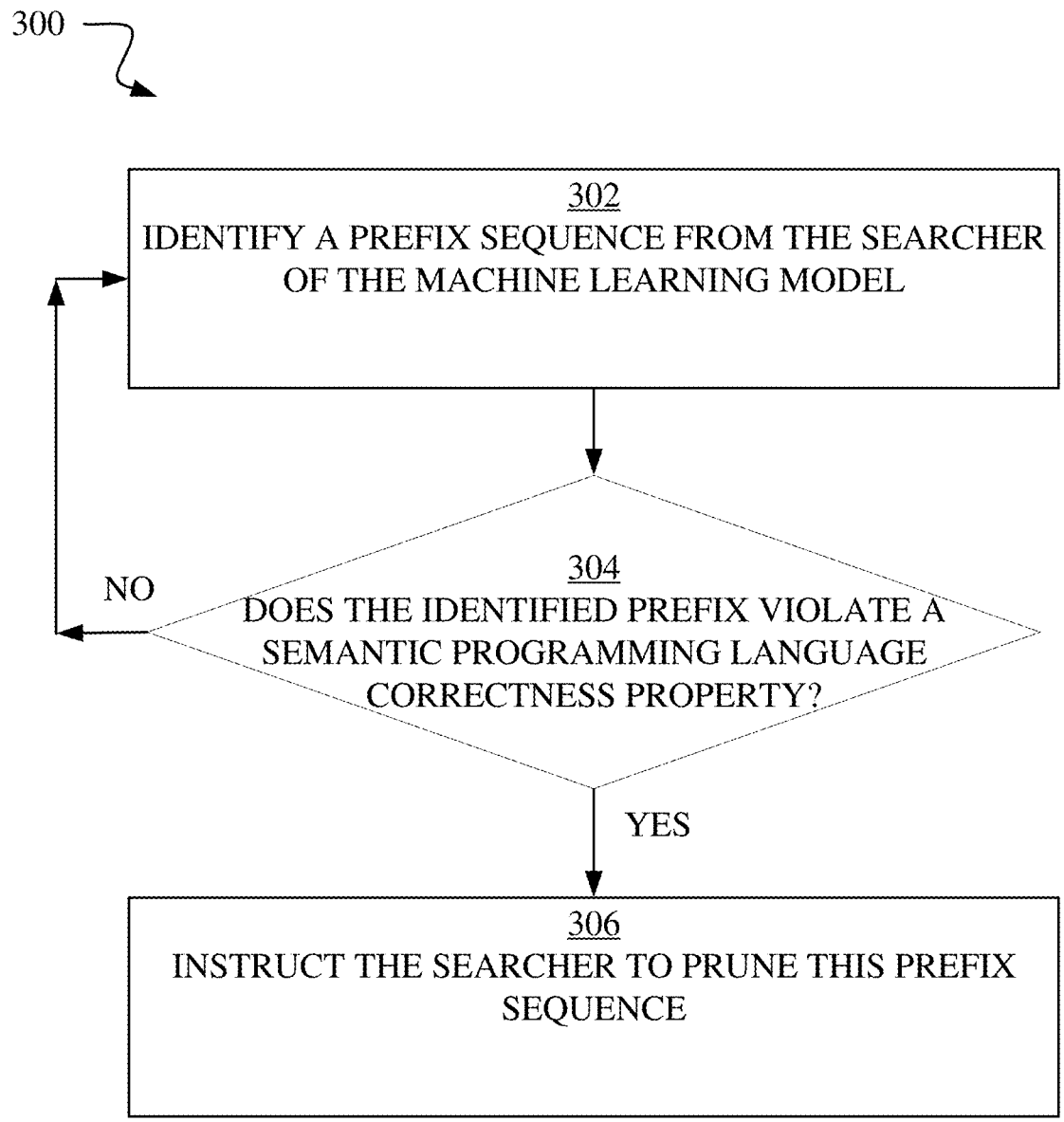
FIG. 3 is a process flow diagram of an example method for reducing semantic errors in code generated by machine learning models, in accordance with some embodiments of the present disclosure.

FIG. 3 is a process flow diagram of an example method for reducing semantic errors in code generated by machine learning models, in accordance with some embodiments of the present disclosure. The pruner 116 and machine learning model 104, described with respect to FIG. 1 can perform the method 300 in accordance with some embodiments of the present disclosure.

At operation 302, the pruner 116 can identify a prefix 114 from the searcher 112 of the machine learning model 104. Identifying the prefix 114 can involve listening to the beam search that the searcher 112 is conducting as the code generator 110 generates new tokens. The pruner 116 thus identifies a newly updated prefix 114.

At operation 304, the pruner 116 can determine if the identified prefix violates a semantic programming language correctness property. Determining if the semantic correctness property is violated can include the checking whether the prefix 114 defines named variables, functions, and the like; whether calls against signatures are valid; whether the prefix 114 uses named variables, functions, and the like; whether the prefix 114 redefines built-ins; whether the prefix 114 redefines functions; whether member accesses are valid; whether the prefix 114 uses variables before assignment; whether the prefix 114 violates coding conventions; and, the like. If the identified prefix 114 does not violate the semantic correctness property, control may flow back to operation 302 for another prefix 114. However, if the identified prefix 114 violates the semantic correctness property, control may flow to operation 306.

At operation 306, the pruner can instruct the searcher 112 to prune the identified prefix 114. The searcher 112 may prune the identified prefix 114 by removing the identified prefix from the beam search. As stated previously, in some embodiments of the present disclosure, instead of instructing the searcher 112 to prune the identified prefix 114, the pruner 116 can assign a weighted numeric value to the prefix 114, indicating the severity of the semantic correctness violation. In this way, the searcher 112 may prioritize prefixes for pruning based on the weights assigned.

Further, in some embodiments of the present disclosure, the pruner 116 can help the searcher 112 to reorder prefixes by multiplying the predicted probability of each prefix 114 with the score that the pruner 116 assigns to that prefix 114, and sorting the set of prefixes 114 in order of those products. Additionally, in some embodiments of the present disclosure, a system, such as the example system 200 can normalize a ground truth for the predicted output code 206.

Figure 4:
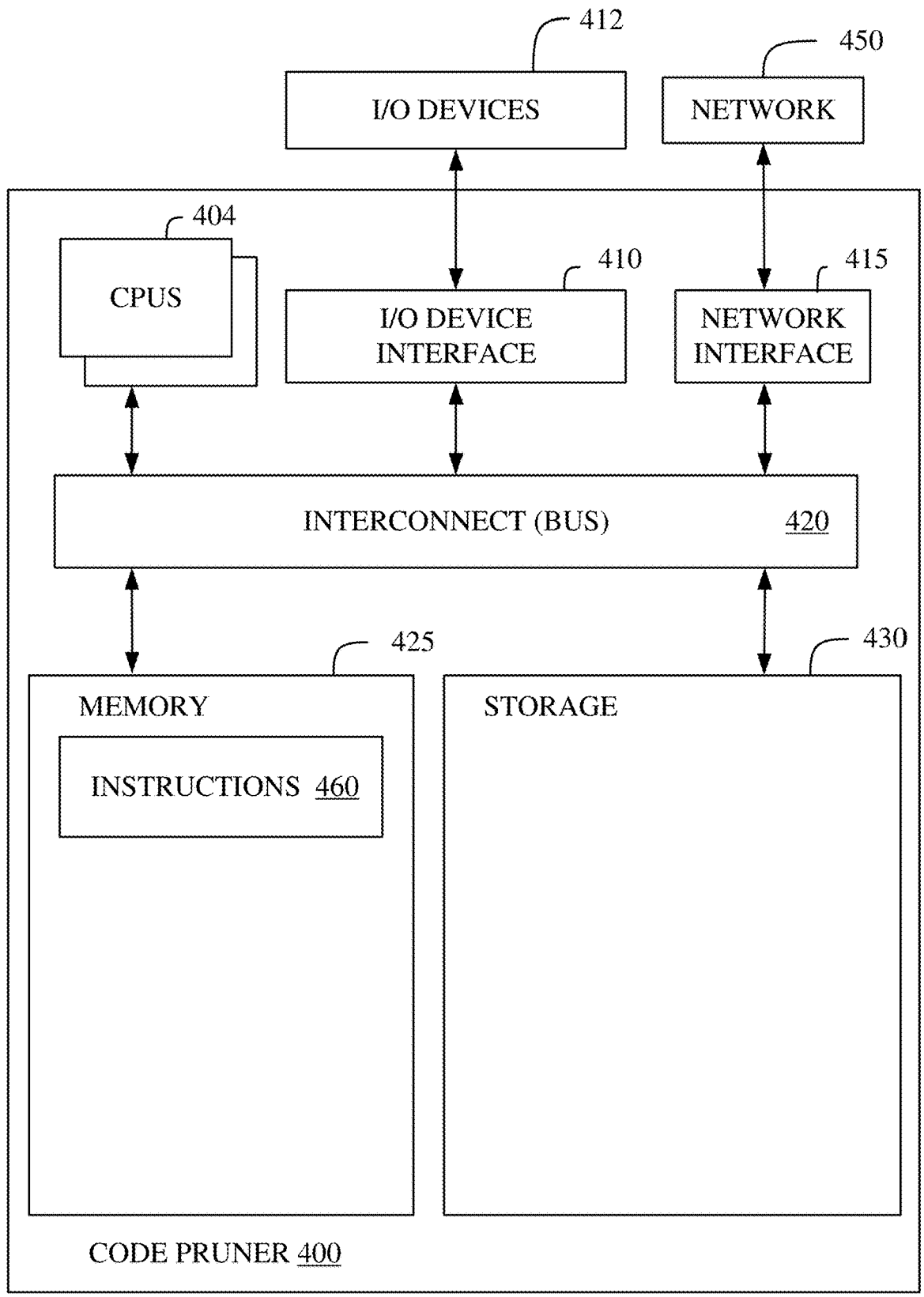
FIG. 4 is a block diagram of a code pruner, in accordance with some embodiments of the present disclosure.

FIG. 4 is a block diagram of an example code pruner 400, in accordance with some embodiments of the present disclosure. In various embodiments, the code pruner 400 is similar to the code pruner 116 and can perform the method described in FIG. 3 and/or the functionality discussed in FIGS. 1-2. In some embodiments, the code pruner 400 provides instructions for the aforementioned methods and/or functionalities to a client machine such that the client machine executes the method, or a portion of the method, based on the instructions provided by the code pruner 400. In some embodiments, the code pruner 400 comprises software executing on hardware incorporated into a plurality of devices.

The code pruner 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, and/or flash memory devices. Additionally, the storage 430 can include storage area-network (SAN) devices, the cloud, or other devices connected to the code pruner 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, any of the methods described in FIG. 3 and/or the functionality discussed in FIGS. 1-2.

In various embodiments, the I/O devices 412 include an interface capable of presenting information and receiving input. For example, I/O devices 412 can present information to a listener interacting with code pruner 400 and receive input from the listener.

The code pruner 400 is connected to the network 450 via the network interface 415. Network 450 can comprise a physical, wireless, cellular, or different network.

In some embodiments, the code pruner 400 can be a multi-user mainframe computer system, a single-user system, or a server computer or similar device that has little or no direct user interface but receives requests from other computer systems (clients). Further, in some embodiments, the code pruner 400 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary code pruner 400. In some embodiments, however, individual components can have greater or lesser complexity than as represented in FIG. 4, components other than or in addition to those shown in FIG. 4 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
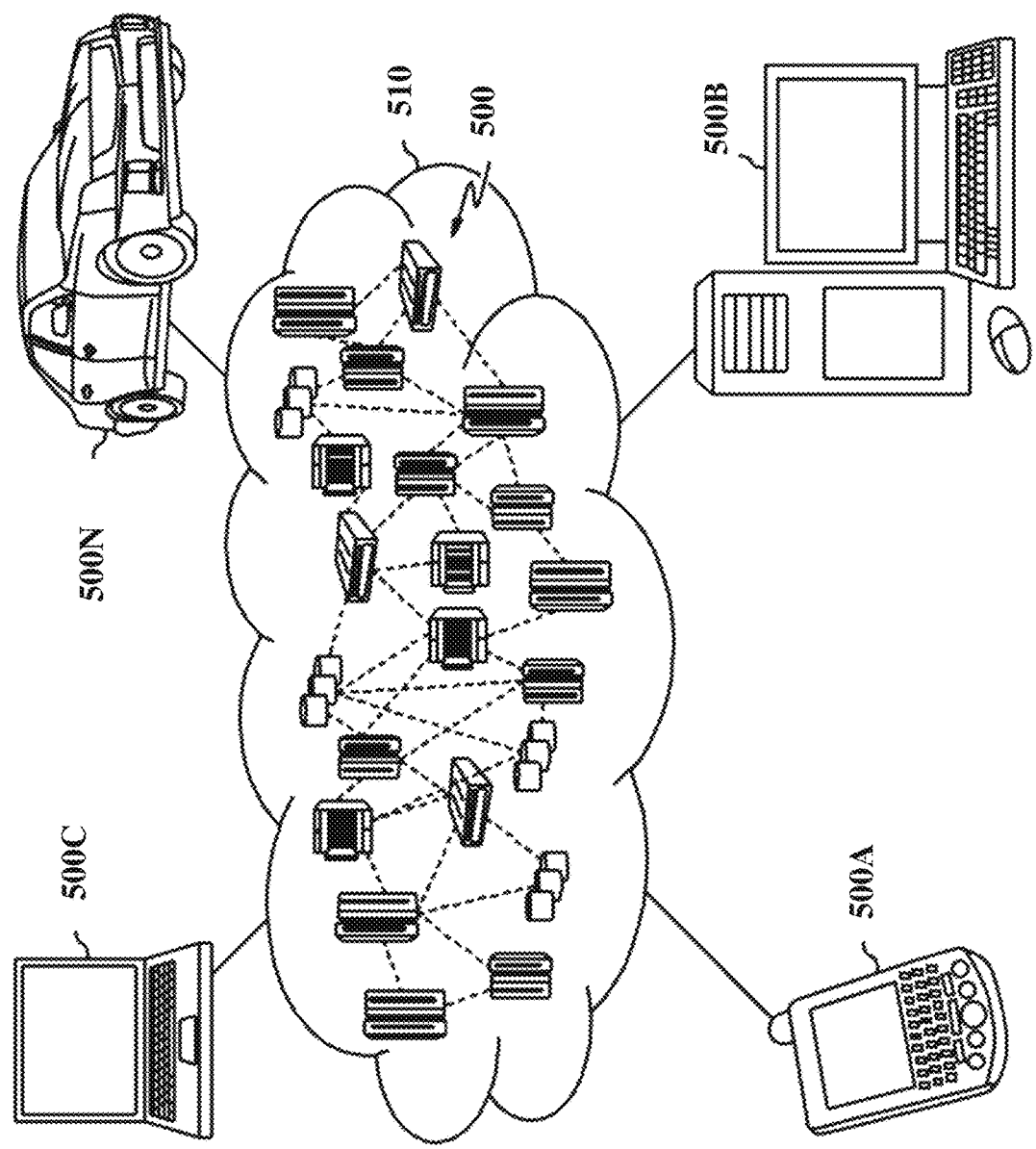
FIG. 5 is a cloud computing environment, in accordance with some embodiments of the present disclosure.

FIG. 5 is a cloud computing environment 510, according to some embodiments of the present disclosure. As shown, cloud computing environment 510 includes one or more cloud computing nodes 500. The cloud computing nodes 500 can perform the method described in FIG. 3 and/or the functionality discussed in FIGS. 1-2. Additionally, cloud computing nodes 500 can communicate with local computing devices used by cloud consumers, such as, for example, personal digital assistant (PDA) or cellular telephone 500A, desktop computer 500B, laptop computer 500C, and/or automobile computer system 500N. Further, the cloud computing nodes 500 can communicate with one another. The cloud computing nodes 500 can also be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
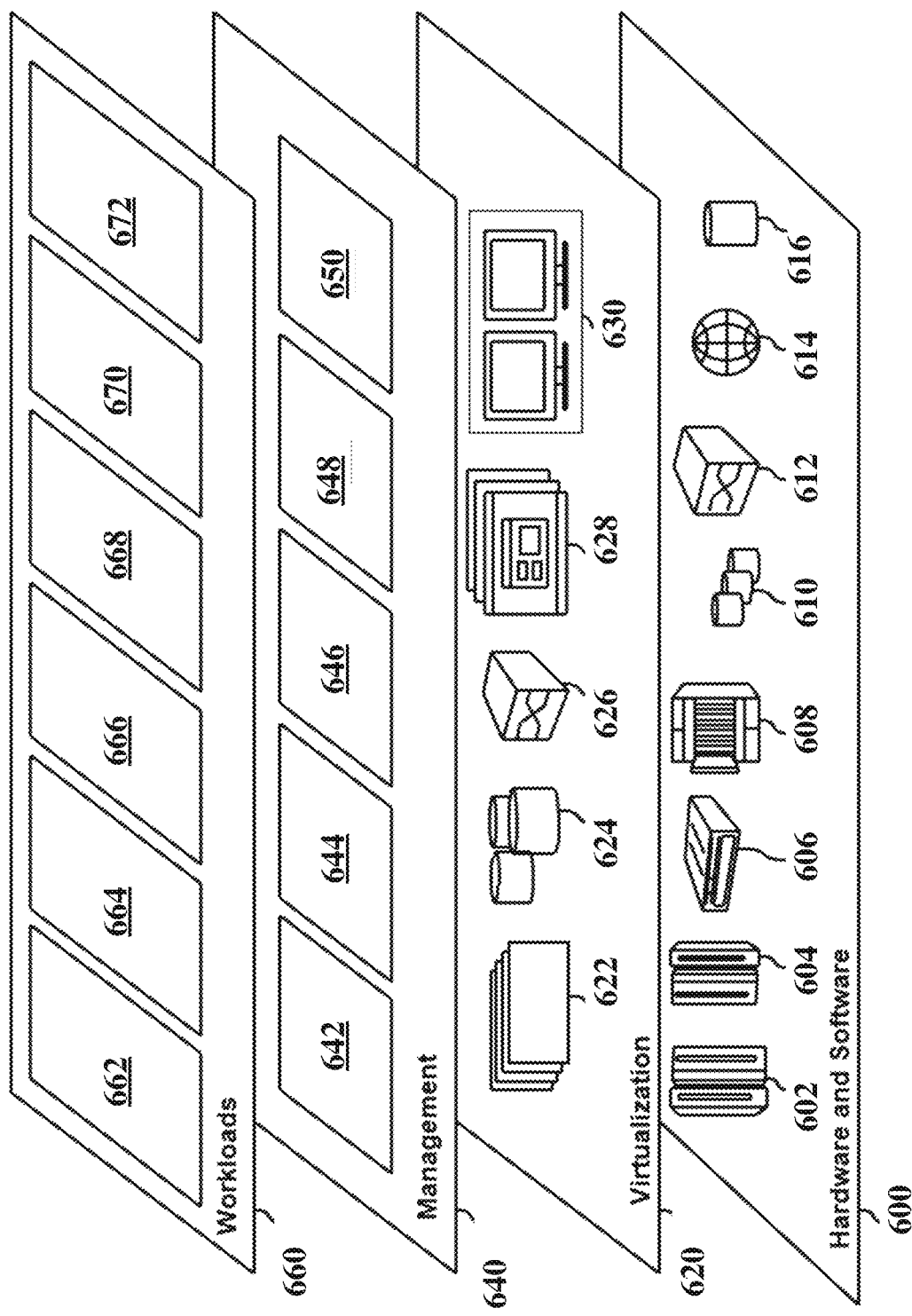
FIG. 6 is a set of functional abstraction model layers provided by the cloud computing environment, in accordance with some embodiments of the present disclosure.

FIG. 6 is a set of functional abstraction model layers provided by cloud computing environment 510 (FIG. 5), according to some embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and code pruner 672.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A non-limiting list of examples are provided hereinafter to demonstrate some aspects of the present disclosure.

Example 1 is a system. The system includes one or more computer processing circuits; and one or more computer-readable storage media storing program instructions which, when executed by the one or more computer processing circuits, are configured to cause the one or more computer processing circuits to perform a method comprising: identifying a prefix updated by a searcher of a machine learning model, wherein the machine learning model is configured to generate source code in a programming language; determining whether the prefix violates a semantic correctness property of the programming language; and instructing the searcher, in response to the determination, to prune the prefix from a set of prefixes under consideration by the searcher.

Example 2 includes the system of example 1, including or excluding optional features. In this example, the system includes completing the prefix before determining whether the prefix violates the semantic correctness property, wherein the completed prefix comprises a completed unit of source code in the programming language.

Example 3 includes the system of any one of examples 1 to 2, including or excluding optional features. In this example, determining whether the prefix violates the semantic correctness property comprises using an attribute grammar.

Example 4 includes the system of any one of examples 1 to 3, including or excluding optional features. In this example, instructing the searcher to prune the prefix comprises assigning a weight to the prefix based on the semantic correctness property.

Example 5 includes the system of any one of examples 1 to 4, including or excluding optional features. In this example, the system includes providing a ground truth for an output code generated by the machine learning model; normalizing the ground truth; and determining a loss by using a loss function for the ground truth and the output code. Optionally, the system includes training the machine learning model based on the loss.

Example 6 includes the system of any one of examples 1 to 5, including or excluding optional features. In this example, the system includes pruning the prefix from the set of prefixes under the consideration by the searcher.

Example 7 includes the system of any one of examples 1 to 6, including or excluding optional features. In this example, the semantic correctness property is selected from a group consisting of: the prefix defines named variables; calls against signatures are valid; the prefix uses the named variables; the prefix redefines built-ins; the prefix redefines functions; one or more member accesses are valid; the prefix uses variables before assignment; and the prefix violates coding conventions.

Example 8 is a computer-implemented method. The method includes identifying a prefix updated by a searcher of a machine learning model, wherein the machine learning model is configured to generate source code in a programming language; determining whether the prefix violates a semantic correctness property of the programming language; instructing the searcher, in response to the determination, to prune the prefix from a set of prefixes under consideration by the searcher; and completing the prefix before determining whether the prefix violates the semantic correctness property, wherein the completed prefix comprises a completed unit of source code in the programming language.

Example 9 includes the method of example 8, including or excluding optional features. In this example, instructing the searcher to prune the prefix comprises assigning a weight to the prefix based on the semantic correctness property.

Example 10 includes the method of any one of examples 8 to 9, including or excluding optional features. In this example, the method includes providing a ground truth for an output code generated by the machine learning model; normalizing the ground truth; and determining a loss by using a loss function for the ground truth and the output code. Optionally, the method includes training the machine learning model based on the loss.

Example 11 includes the method of any one of examples 8 to 10, including or excluding optional features. In this example, the method includes pruning the prefix from the set of prefixes under the consideration by the searcher.

Example 12 includes the method of any one of examples 8 to 11, including or excluding optional features. In this example, the semantic correctness property is selected from a group consisting of: the prefix defines named variables; calls against signatures are valid; the prefix uses the named variables; the prefix redefines built-ins; the prefix redefines functions; one or more member accesses are valid; the prefix uses variables before assignment; and the prefix violates coding conventions.

Example 13 is a computer program product. The computer program product includes identifying a prefix updated by a searcher of a machine learning model, wherein the machine learning model is configured to generate source code in a programming language; determining whether the prefix violates a semantic correctness property of the programming language; instructing the searcher, in response to the determination, to prune the prefix from a set of prefixes under consideration by the searcher; and completing the prefix before determining whether the prefix violates the semantic correctness property, wherein the completed prefix comprises a completed unit of source code in the programming language.

Example 14 includes the computer program product of example 13, including or excluding optional features. In this example, instructing the searcher to prune the prefix comprises assigning a weight to the prefix based on the semantic correctness property.

Example 15 includes the computer program product of any one of examples 13 to 14, including or excluding optional features. In this example, the computer program product includes providing a ground truth for an output code generated by the machine learning model; normalizing the ground truth; and determining a loss by using a loss function for the ground truth and the output code. Optionally, the computer program product includes training the machine learning model based on the loss.

Example 16 includes the computer program product of any one of examples 13 to 15, including or excluding optional features. In this example, the computer program product includes pruning the prefix from the set of prefixes under the consideration by the searcher.

Example 17 includes the computer program product of any one of examples 13 to 16, including or excluding optional features. In this example, the semantic correctness property is selected from a group consisting of: the prefix defines named variables; calls against signatures are valid; the prefix uses the named variables; the prefix redefines built-ins; the prefix redefines functions; one or more member accesses are valid; the prefix uses variables before assignment; and the prefix violates coding conventions.

What is claimed is:

1. A system comprising:
   one or more computer processing circuits; and
   one or more computer-readable storage media storing program instructions which, when executed by the one or more computer processing circuits, are configured to cause the one or more computer processing circuits to perform a method comprising:
   identifying a prefix updated by a searcher of a machine learning model, wherein the machine learning model is configured to generate source code in a programming language;
   determining whether the prefix violates a semantic correctness property of the programming language; and
   instructing the searcher, in response to the determination, to prune the prefix from a set of prefixes under consideration by the searcher.

2. The system of claim 1, the method further comprising completing the prefix before determining whether the prefix violates the semantic correctness property, wherein the completed prefix comprises a completed unit of source code in the programming language.

3. The system of claim 1, wherein determining whether the prefix violates the semantic correctness property comprises using an attribute grammar.

4. The system of claim 1, wherein instructing the searcher to prune the prefix comprises assigning a weight to the prefix based on the semantic correctness property.

5. The system of claim 1, the method further comprising:
   providing a ground truth for an output code generated by the machine learning model;
   normalizing the ground truth; and
   determining a loss by using a loss function for the ground truth and the output code.

6. The system of claim 5, the method further comprising training the machine learning model based on the loss.

7. The system of claim 1, the method further comprising pruning the prefix from the set of prefixes under the consideration by the searcher.

8. The system of claim 1, wherein the semantic correctness property is selected from a group consisting of:
   the prefix defines named variables;
   calls against signatures are valid;
   the prefix uses the named variables;
   the prefix redefines built-ins;
   the prefix redefines functions;
   one or more member accesses are valid;
   the prefix uses variables before assignment; and
   the prefix violates coding conventions.

9. A computer-implemented method, comprising:
   identifying a prefix updated by a searcher of a machine learning model, wherein the machine learning model is configured to generate source code in a programming language;
   determining whether the prefix violates a semantic correctness property of the programming language;
   instructing the searcher, in response to the determination, to prune the prefix from a set of prefixes under consideration by the searcher; and
   completing the prefix before determining whether the prefix violates the semantic correctness property, wherein the completed prefix comprises a completed unit of source code in the programming language.

10. The method of claim 9, wherein instructing the searcher to prune the prefix comprises assigning a weight to the prefix based on the semantic correctness property.

11. The method of claim 9, the method further comprising:
    providing a ground truth for an output code generated by the machine learning model;
    normalizing the ground truth; and
    determining a loss by using a loss function for the ground truth and the output code.

12. The method of claim 11, further comprising training the machine learning model based on the loss.

13. The method of claim 9, the method further comprising pruning the prefix from the set of prefixes under the consideration by the searcher.

14. The method of claim 9, wherein the semantic correctness property is selected from a group consisting of:
    the prefix defines named variables;
    calls against signatures are valid;
    the prefix uses the named variables;
    the prefix redefines built-ins;

the prefix redefines functions;
one or more member accesses are valid;
the prefix uses variables before assignment; and
the prefix violates coding conventions.

15. A computer program product comprising one or more computer readable storage media, and program instructions collectively stored on the one or more computer readable storage media, the program instructions comprising instructions configured to cause one or more processors to perform a method comprising:
   identifying a prefix updated by a searcher of a machine learning model, wherein the machine learning model is configured to generate source code in a programming language;
   determining whether the prefix violates a semantic correctness property of the programming language;
   instructing the searcher, in response to the determination, to prune the prefix from a set of prefixes under consideration by the searcher; and
   completing the prefix before determining whether the prefix violates the semantic correctness property, wherein the completed prefix comprises a completed unit of source code in the programming language.

16. The computer program product of claim 15, wherein instructing the searcher to prune the prefix comprises assigning a weight to the prefix based on the semantic correctness property.

17. The computer program product of claim 15, the method further comprising:
   providing a ground truth for an output code generated by the machine learning model;
   normalizing the ground truth; and
   determining a loss by using a loss function for the ground truth and the output code.

18. The computer program product of claim 17, the method further comprising training the machine learning model based on the loss.

19. The computer program product of claim 15, the method further comprising pruning the prefix from the set of prefixes under the consideration by the searcher.

20. The computer program product of claim 15, wherein the semantic correctness property is selected from a group consisting of:
   the prefix defines named variables;
   calls against signatures are valid;
   the prefix uses the named variables;
   the prefix redefines built-ins;
   the prefix redefines functions;
   one or more member accesses are valid;
   the prefix uses variables before assignment; and
   the prefix violates coding conventions.

* * * * *